United States Patent Office 3,400,587
Patented Sept. 10, 1968

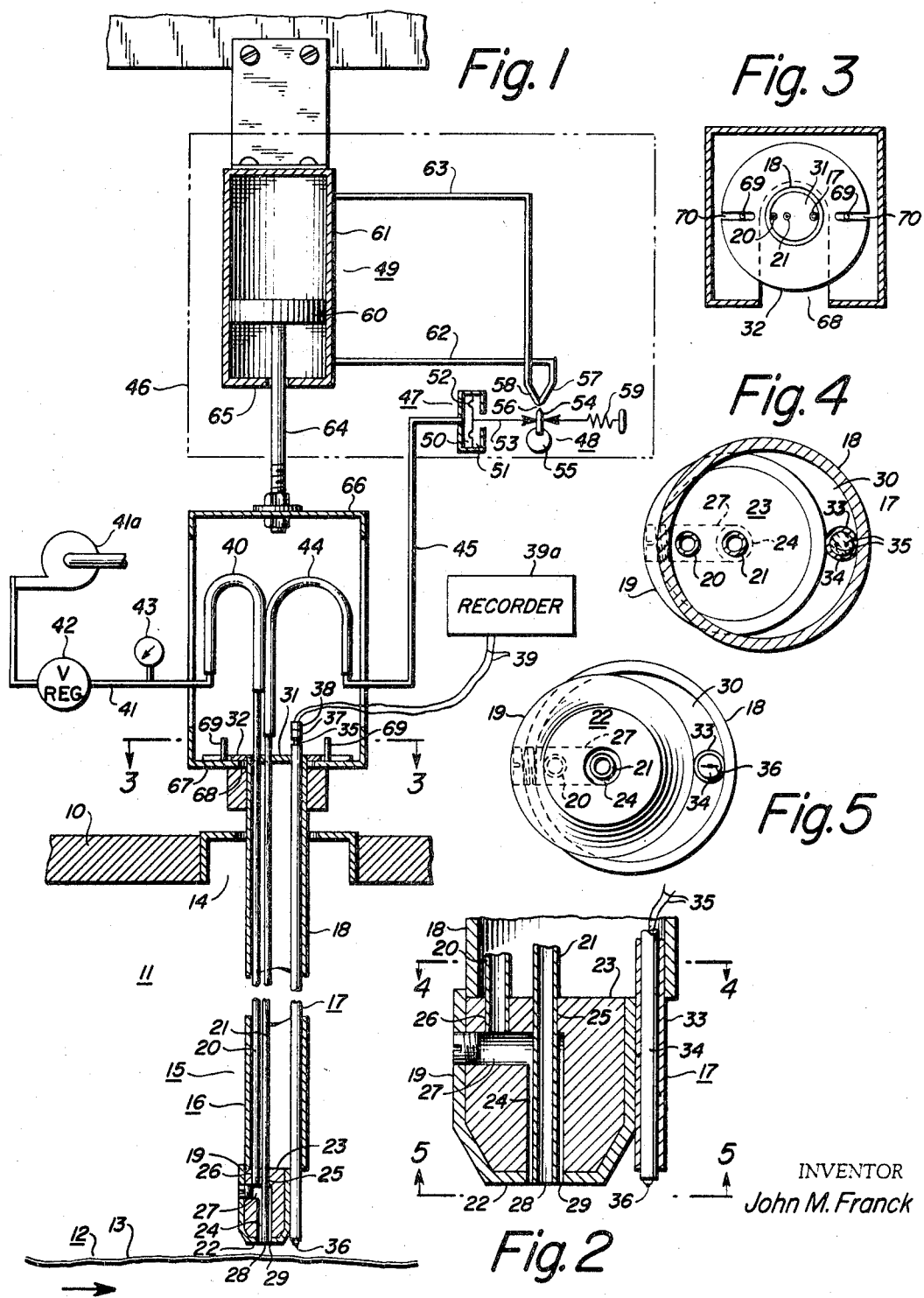

3,400,587
APPARATUS FOR MEASURING THE TEMPERATURE OF A MOVING SURFACE
John M. Franck, Baltimore, Md., assignor to Bethlehem Steel Corporation, a corporation of Delaware
Filed Sept. 3, 1965, Ser. No. 484,915
3 Claims. (Cl. 73—343)

ABSTRACT OF THE DISCLOSURE

Temperature measuring apparatus including a sensing device, a thermocouple and a protection tube which are secured together to move as a unit and are operatively connected to a servo-mechanism regulator. The thermocouple is maintained a relatively constant distance from the surface of moving material by means of the sensing device which transmits variations in pressure, based upon the distance of the device from the material, to the regulator which reacts to move the sensing device and thermocouple to maintain them a fixed distance from the material surface.

---

This invention relates in general to improvements in temperature measuring devices and more particularly to an improved non-contact thermocouple device which is especially suitable for continuously measuring the surface temperature of moving strip material.

In many processes, such as the annealing or plating of metal strip, the quality of the finished product is dependent upon the ability of operators to control, within narrow limits, the temperature of the material being processed. Numerous devices such as radiation pyrometers and contact-type thermocouples are currently utilized for measuring the temperature of moving bodies. However, none of these devices satisfactorily measures the temperature of material which has a surface that changes position and/or is not uniformly level as it passes through a furnace. Radiation pyrometer readings must be adjusted for variations in emissivity whenever there is a change in the gauge of sheet being heated, particularly when the temperature of the product passing through a furnace is not the same as the furnace temperature. For different surfaces of metal sheet the emissivity factor varies so that adjustments must be made in the readings of a radiation pyrometer. At times, operators fail to take into account the changes in emissivity with the result that the finished product does not meet the desired standard of quality. Contact-type thermocouples are generally held in a relatively fixed location so they do not closely follow the contours of material which has a surface that changes position. When a fixed-position-contact-type thermocouple is used to measure the temperature of such a material, the thermocouple may, at times, lose contact with the material's surface. During such periods, the thermocouple will not provide an accurate indication of the material's true temperature. At the other extreme, the surface of the material may contact the thermocouple with sufficient force to damage both the thermocouple and the material.

It is an object of this invention to provide a thermocouple assembly which will accurately and continuously measure the temperature of moving material without causing any damage thereto.

It is another object of this invention to provide a non-contact type thermocouple apparatus which will maintain itself a relatively constant distance from moving material which has an irregular surface or one that changes position while passing through a furnace.

The foregoing objects are attained by combining a position sensing device with a thermocouple, as hereinafter described, so that the combination assembly has its lower end maintained a relatively short fixed distance from the surface of moving material the temperature of which is being measured by the thermocouple.

FIG. 1 is a diagrammatic vertical sectional view of the apparatus of this invention positioned in relation to strip material moving through a furnace.

FIG. 2 is an enlarged sectional view of the lower portion of the apparatus shown in FIG. 1.

FIG. 3 is a section taken along line 3—3 of FIG. 1.

FIG. 4 is a section taken along line 4—4 of FIG. 2.

FIG. 5 is an end view taken along line 5—5 of FIG. 2.

The general arrangement of the apparatus of this invention may best be understood by considering the view of FIG. 1 wherein the reference numeral 10 designates the roof of a horizontal type furnace 11 through which continuous metal strip 12 moves, in the direction of the arrow. Strip 12 has upper surface 13, which, for various reasons, is not uniformly level as it passes through the furnace. Extending downwardly through opening 14 in furnace roof 10 is the non-contact thermocouple apparatus 15 of this invention which is utilized to continuously measure the temperature of strip 12.

Thermocouple apparatus 15, which moves as a unit, comprises sensing device 16, thermocouple assembly 17 and protection tube 18.

Sensing device 16 comprises nozzle 19, pressure fluid supply tube 20 and pressure impulse transmitting tube 21. Nozzle 19 has lower face 22 and upper face 23. Within nozzle 19, extending upwardly from lower face 22, is chamber 24. Longitudinally axially aligned therewith is bore 25, of reduced size, which extends upwardly to nozzle face 23. Extending downwardly from nozzle upper face 23, spaced from bore 25, is port 26 which is connected to chamber 24 by means of passageway 27. Pressure fluid supply tube 20 connects with nozzle port 26, and pressure impulse transmitting tube 21 extends through bore 25 and chamber 24, with the lower or exit end 28 of tube 21 flush with nozzle lower face 22. The lower portion of tube 21 extends concentrically through chamber 24 forming at the lower end thereof annular exit orifice 29.

Protection tube 18 is of a larger diameter than nozzle 19 and is joined to its upper end in a suitable manner, as by welding. The vertical center lines of tube 18 and nozzle 19 are out of alignment thereby creating a crescent shaped opening 30 between the upper end of nozzle 19 and the lower end of tube 18. The upper end of protection tube 18 is closed by disc 31 which has three openings through which pass thermocouple assembly 17, fluid supply tube 20 and impulse transmitting tube 21. Extending outwardly from the upper end of tube 18 is flange 32. Fluid supply tube 20 and impulse transmitting tube 21 extend from above disc 31 through protection tube 18 and connect with nozzle 19, as described above. Thermocouple assembly 17 extends from above disc 31 through protection tube 18 and out of its lower end through opening 30, as shown in detail in FIG. 2.

Thermocouple assembly 17 has outer tube 33 which extends through protection tube 18 and projects below its lower end, alongside nozzle 19. An insulator element 34 extends through tube 18. Element 34 has longitudinally extending holes through which pass thermoelement wires 35 which are joined together at their lower ends to form hot junction 36. The upper ends of thermoelement wires 35 project above insulator element 34 and tube 33 and are connected to a jack 37 which is joined to plug 38. Lead wires 39 connect plug 38 with a suitable temperature-controller recording instrument 39a.

Flexible tubing 40 and fluid supply line 41 connect pressure fluid supply tube 20 to a source 41a of constant pressure fluid. Line 41 has the usual pressure regulator 42 and pressure gauge 43.

Pressure impulse transmitting tube 21 is connected through flexible tubing 44 and line 45 to servomechanism regulator 46. Regulator 46 includes diaphragm assembly 47, jet pipe assembly 48 and power unit 49. Diaphragm assembly 47, to which line 45 is connected, includes closed chamber 50 and open chamber 51 which are separated by diaphragm 52 that is coupled by link 53 to jet pipe 54 of assembly 48. Jet pipe 54 has pivoted end 55 and movable end 56 through which a jet of liquid under pressure is directed toward a pair of receiver ports 57 and 58. Return spring 59 establishes the neutral position of jet pipe 54. The liquid directed toward ports 57 and 58 controls the movement of piston 60 in cylinder 61 of power unit 49. Receiver port 57 is connected through line 62 to the lower end of cylinder 61 while port 58 is connected to the upper end of cylinder 61 by means of line 63. Rod 64 extends from the bottom side of piston 60 through bottom wall 65 of cylinder 61 to the upper side of thermocouple apparatus support bracket 66.

Bottom member 67 of bracket 66 is slotted, as at 68 so that thermocouple apparatus 15 can easily be placed in position in the furnace and removed when repairs are necessary. Protection tube flange 32 rests on bracket bottom member 67 and the studs 69 projecting upwardly therefrom are loosely engaged by slots 70 of flange 32. This construction prevents thermocouple apparatus 15 from rotating and keeps thermocouple hot junction 36 on the down stream side of nozzle 19 thereby protecting it from damage. By having flange 32 just resting on bracket bottom member 67 and only loosely engaged by studs 69 thereon, apparatus 15 is free to move upwardly away from bottom member 67 in the event the servomechanism fails to raise the apparatus and nozzle 19 is contacted by a raised portion of the strip material.

Thermocouple apparatus 15 functions in a manner to maintain itself a predetermined distance from the surface 13 of strip material 12 and continuously measures its temperature. Fluid, under constant pressure, is forced through line 41, flexible tubing 40 and tube 20 to nozzle 19 where it passes through passageway 27 and chamber 24 and is discharged from annular exit orifice 29. The pressurized fluid striking strip material 12 creates a pressurized zone between strip material 12 and nozzle 19, and the resultant back pressure is transmitted through impulse transmitting tube 21, flexible tubing 44 and line 45 to chamber 50 and against diaphragm 52 of assembly 47 of servomechanism regulator 46. When nozzle 19 is the desired predetermined distance from the surface 13 of strip 12 return spring 59 is set to position jet pipe 54 in the natural position wherein the liquid discharged from jet movable end 56 is equally in registration with receiver ports 57 and 58, and an equal amount of liquid flows to both ends of cylinder 61 thereby maintaining stationary the position of apparatus 15.

In the event the surface 13 of strip 15 changes position and moves closer to nozzle face 22, the increased pressure created thereby is transmitted through the pressure impulse tubes and line 21, 44 and 45, respectively, to diaphragm 52 causing jet pipe 54 to move so as to direct a greater portion of the liquid discharged therefrom through port 57 and line 62 to the lower end of cylinder 61. The increased flow of liquid to the lower end of cylinder 61 forces piston 60 and rod 64 upwardly, thereby causing bracket 66 and apparatus 15 to move upwardly in like manner.

When the distance between strip surface 13 and nozzle face 22 is greater than the desired predetermined distance, the resultant pressure transmitted to diaphragm 52 decreases, and jet pipe 54 moves so as to direct a greater portion of the liquid discharged therefrom through port 58 and line 63 to the upper end of cylinder 61. Consequently, piston 60 and rod 64 are moved downwardly lowering bracket 66 and thermocouple apparatus 15 suspended therefrom.

The movement of thermocouple apparatus 15 as a unit maintains hot junction 36 of thermocouple assembly 17 the desired distance from the surface of material the temperature of which is being measured. In this manner a continuous accurate temperature measurement is made and the furnace is maintained at a more uniform temperature than was previously the case. Naturally, with heavy gauge slow moving material passing through the furnace it is possible to maintain the thermocouple hot junction 36 very close, e.g., $\frac{1}{32}''$, to the material surface, while with light gauge fast moving material, which has a more uneven surface, hot junction 36 must be kept farther away, e.g., approximately $\frac{1}{4}''$. Air or, when an inert atmosphere is maintained in the furnace, an inert gas can be utilized as the pressure fluid.

Although certain novel features of my invention have been shown and described, it will be understood that changes and modifications may be made without departing from the spirit of the invention or the scope of the appended claims.

I claim:

1. In an improved thermocouple device adapted to be projected into a furnace and operated in conjunction with a temperature recording instrument, a source of constant pressure fluid, and a servomechanism regulator which functions, in response to variations in pressure transmitted thereto, to maintain said thermocouple device a predetermined distance from the surface of a material moving through said furnace, the improvement comprising:

(A) a sensing nozzle having:
  (1) a chamber extending upwardly from the lower face of said nozzle,
  (2) a bore axially aligned with said chamber and extending upwardly therefrom to the upper face of said nozzle,
  (3) a port, extending downwardly from the upper face of said nozzle, connecting with said chamber,
(B) a protection tube, having a lower end and an upper end, extending upwardly from said sensing nozzle,
(C) means joining the upper end of said protection tube with said servomechanism regulator,
(D) a pressure fluid supply tube, extending through said protection tube, connected to the upper end of said sensing nozzle and communicating with said port and said chamber therein,
(E) an impulse transmitting tube, extending through said protection tube, having the lower portion thereof passing into said sensing nozzle, said impulse tube extending concentrically into said nozzle chamber and having the lower end of said impulse tube adjacent the lower face of said nozzle,
(F) an annular exit orifice, at the lower face of said nozzle, formed by the lower end of said impulse tube and said nozzle chamber,
(G) a thermocouple assembly comprising:
  (1) an outer tube having the lower portion thereof adjacent said sensing nozzle,
  (2) an insulator within said outer tube,
  (3) thermoelement wires extending through said insulator,
  (4) a hot junction, adjacent the lower face of said sensing nozzle,
(H) means connecting said source of constant pressure fluid with said fluid supply tube whereby pressurized fluid is delivered to said nozzle chamber and expelled therefrom, through said annular exit orifice, against the surface of said moving material thereby creating, between said surface of said moving material and said nozzle, a pressurized zone which creates a back pressure within said impulse tube,
(I) means connecting the upper end of said impulse transmitting tube with said servomechanism regulator whereby the back pressure within said impulse tube is transmitted to said regulator to cause said regulator to lower said sensing nozzle in response to a decrease in back pressure when said sensing nozzle is more than said predetermined distance from said surface of said moving material and to cause said regulator to raise said sensing nozzle in response to an increase in back pressure when said sensing nozzle is less than said predetermined distance from said surface of moving material, (J) means connecting said thermocouple assembly with said sensing nozzle so that said sensing nozzle and said thermocouple assembly move as a unit thereby maintaining said thermocouple assembly hot junction said predetermined distance from said moving material surface.

2. An improved thermocouple device according to claim 1 wherein said thermocouple assembly extends through said protection tube.

3. An improved thermocouple device according to claim 1 wherein said means joining the upper end of said protection tube with said servomechanism regulator fixes the orientation of said thermocouple assembly and said sensing nozzle in respect to said surface of said moving material so that in relation thereto said thermocouple assembly hot junction is on the downstream side of said nozzle.

References Cited
UNITED STATES PATENTS

| | | | |
|---|---|---|---|
| 2,991,654 | 7/1961 | Engelhard | 73—359 |
| 3,025,696 | 3/1962 | Matteson | 73—37.6 |
| 3,194,055 | 7/1965 | Knobel | 73—37.5 |

DAVID SCHONBERG, *Primary Examiner.*

F. SHOON, *Assistant Examiner.*